(12) United States Patent
Axmon et al.

(10) Patent No.: US 8,781,467 B2
(45) Date of Patent: Jul. 15, 2014

(54) TECHNIQUE FOR CELL SIGNATURE DETERMINATION

(75) Inventors: Joakim Axmon, Kävlinge (SE); Niklas Andgart, Södra Sandby (SE); Srinivas Badagandi, Bangalore (IN); Oliver Klein, Nuremberg (DE); Dietmar Lipka, Berg (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 64 days.

(21) Appl. No.: 13/699,179

(22) PCT Filed: May 13, 2011

(86) PCT No.: PCT/EP2011/057744
§ 371 (c)(1),
(2), (4) Date: Feb. 22, 2013

(87) PCT Pub. No.: WO2011/147692
PCT Pub. Date: Dec. 1, 2011

(65) Prior Publication Data
US 2013/0143556 A1 Jun. 6, 2013

Related U.S. Application Data

(60) Provisional application No. 61/348,872, filed on May 27, 2010.

(30) Foreign Application Priority Data

May 25, 2010 (EP) .................................. 10005427

(51) Int. Cl.
*H04W 4/00* (2009.01)
*H04B 7/00* (2006.01)

(52) U.S. Cl.
USPC .......................................... 455/434; 455/502

(58) Field of Classification Search
CPC ......................... H04W 48/16; H04W 36/0061; H04W 56/00; H04J 11/0069; H04J 11/0076; H04J 11/0086; H04J 11/0073
USPC .................................................. 455/434, 502
See application file for complete search history.

(56) References Cited

U.S. PATENT DOCUMENTS 8,588,774 B2 * 11/2013 Klein et al. .................... 455/434
2009/0232125 A1 9/2009 Kim et al.

(Continued)

FOREIGN PATENT DOCUMENTS

CN 101393988 A 2/2009
WO 2009039470 A1 3/2009

OTHER PUBLICATIONS

3GPP TSG RAN WG1 Meeting #46bis; "SCH Structure and Initial Cell Search Procedure for E-UTRA"; R1-062783; Agenda Item 6.4.4; Oct. 9-13, 2006; pp. 1-9; Seoul, Korea.

(Continued)

*Primary Examiner* — Marisol Figueroa
(74) *Attorney, Agent, or Firm* — Coats & Bennett, P.L.L.C.

(57) ABSTRACT

A technique for cell signature determination in a cellular communication network is provided. A method implementation of this technique comprises the steps of providing a set of hypothesis signals, each hypothesis signal including a signature hypothesis, receiving a composite signal including a first signal portion carrying a first signature from a first cell and a second signal portion carrying a second signature from a second cell, wherein the first signal portion and the second signal portion overlap at least partially in time, and obtaining a correlation result by correlating the composite signal with each hypothesis signal. After the first signature has been determined, a set of phantom signatures associated with the first signature is provided. The phantom signatures represent artifacts from the first signal portion in the correlation result. Finally, the second signature is determined based on the correlation result taking into account the set of phantom signatures associated with the first signature.

20 Claims, 13 Drawing Sheets

(56) References Cited

U.S. PATENT DOCUMENTS

| | | |
|---|---|---|
| 2010/0003992 A1 | 1/2010 | Cao et al. |
| 2010/0178912 A1* | 7/2010 | Gunnarsson et al. ......... 455/423 |
| 2013/0273912 A1* | 10/2013 | Xu et al. ..................... 455/434 |
| 2013/0343267 A1* | 12/2013 | Anand et al. .................. 370/328 |

OTHER PUBLICATIONS

Park, H.-G.; Kim, I.-K.; Kim, Y.-S.; "Efficient Coherent Neighbour Cell Search for Synchronous 3GPP LTE System", Electronics Letters Oct. 9, 2008; pp. 1-2, vol. 44. No. 21; The Institute of Engineering and Technology, May 27, 2008; Electronics Letters online No. 20081490 doi: 10.1049/el:20081490.

3rd Generation Partnership Project; "Technical Specification Group Radio Access Network; Evolved Universal Terrestrial Radio Access (E-UTRA); Physical Channels and Modulation (Release 9)"; 3GPP TS 36.211; pp. 1-85; 650, V9.0.0 (Dec. 2009); Route des Lucioles—Sophia Antipolis, Valbonne, France.

3rd Generation Partnership Project; Technical Specification Group Radio Access Network; Evolved Universal Terrestrial Radio Access (E-UTRA); Requirements for Support of Radio Resource Management (Release 9); 3GPP TS 36.133; pp. 1-359; V9.2.0 (Dec. 2009); Route des Lucioles—Sophia Antipolis, Valbonne, France.

* cited by examiner

TECHNIQUE FOR CELL SIGNATURE DETERMINATION

TECHNICAL FIELD

The present disclosure generally relates to cellular communication networks. In particular, a technique for determining cell signatures is presented.

BACKGROUND

A cell search procedure is typically initiated by a user terminal upon power on or in preparation for a potential handover. In Evolved Universal Terrestrial Radio Access (E-UTRA) networks, the cell search procedure is based on a synchronization process between a user terminal (or User Equipment, UE) and a base station (or eNodeB) of the E-UTRA network potentially serving the user terminal. The synchronization process involves Primary and Secondary Synchronization Signals (PSSs and SSSs) and provides frequency and symbol synchronization, frame synchronization and cell signature detection.

504 unique Physical Cell Identities (PCIs) can be assigned in an E-UTRA network. The PCIs are grouped into 168 PCI groups, each PCI group comprising 3 PCIs. The space of 504 PCIs is jointly spanned by the PSS and SSS as defined in Section 6.11 the $3^{rd}$ Generation Partnership Project (3GPP) Technical Specification (TS) 36.211 V.8.9.0 (2010-01). Each SSS additionally carries frame timing information indicative of whether the particular SSS is transmitted in subframe 0 or subframe 5. The timing information is exploited for frame synchronization. Additionally, the SSS is indicative of a particular Cyclic Prefix (CP) configuration employed by the respective eNodeB.

In E-UTRA networks, two different duplex modes are defined. Time Division Duplex (TDD) networks are operated synchronously, which means that the respective cells are aligned with respect to their frame timing. This also implies that synchronization signals from different cells may overlap at least partially in time. Frequency Division Duplex (FDD) networks operate either synchronously or asynchronously. It has been found that even in an asynchronous mode of operation, an at least partial overlap of synchronization signals from different cells may occur.

As a consequence of overlapping synchronization signals from different cells, the cell search procedure will be impaired. It has been observed in E-UTRA networks that cell search procedures become particularly error-prone in case of overlapping synchronization signals from "competing" cells utilizing the same PSS version. As a consequence, it takes more time to detect weaker cells potentially hidden behind a stronger cell. Under unfavourable conditions, the weaker cells may not be detectable at all.

SUMMARY

There is a need for a technique that permits a reliable cell signature determination when two or more signals carrying cell signatures overlap in time.

According to one aspect, a method of cell signature determination in a cellular communication network is provided, wherein the method comprises providing a set of hypothesis signals, each hypothesis signal including a signature hypothesis, receiving a composite signal including a first signal portion carrying a first signature from a first cell and a second signal portion carrying a second signature from a second cell, wherein the first signal portion and the second signal portion overlap at least partially in time, obtaining a correlation result by correlating the composite signal with each hypothesis signal, determining the first signature, providing a set of phantom signatures associated with the first signature, wherein each phantom signature represents an artefact from the first signal portion in the correlation result, and determining the second signature based on the correlation result taking into account the set of phantom signatures associated with the first signature.

As understood herein, a cell signature may be any item of information which at least in principle allows to distinguish the first cell from the second cell, or a portion of such an item of information. It should be noted that the cell signature need not be unique (e.g., within a cell or an access network comprising multiple cells or among multiple access networks). As an example, the cell signature may comprise a PCI or only a PCI portion used for spanning a PCI space. Such a PCI portion may, for example, take the form of a PCI group identifier. It should also be noted that a single cell may have more than one cell signature.

The signature hypotheses may be known a priori to an apparatus executing the method. Therefore, the signature hypotheses may be pre-stored in a local memory of the apparatus. As a non-limiting example, in an E-UTRA scenario the signature hypotheses may correspond to the 504 PCIs, the 168 PCI group identifiers and/or the three PCI-within-group identifiers that may potentially be assigned by an E-UTRA network. As such, the hypothesis signals may correspond to SSS replicas (as for use in an "exhaustive" search). The composite signal, on the other hand, may be received via an air interface of the apparatus and may thus comprise overlapping signal portions from different cells (e.g., transmitted from different base stations).

The first signal may belong to a stronger cell (i.e., to a cell having a higher signal strength), and the second signature may belong to a weaker cell (e.g., to a cell having a lower signal strength). It should be noted, however, that the technique presented herein is not limited to any particular signal strength relationship between the first cell and the second cell. It should also be noted that the technique can be readily extended to scenarios with three or more competing cells of generally different or generally similar signal strengths.

The determination of the second signature based on the correlation result (e.g., from correlation metrics) may be improved when taking into account the set of phantom signatures associated with the first signature. As an example, the correlation result may be processed based on the set of phantom signatures before the second signature is determined from the processed correlation result.

The set of phantom signatures may be determined in various ways. According to one exemplary implementation, the set of phantom signatures is determined based on a correlation procedure from the correlation result. The correlation procedure may involve correlating the first signal portion (or a replica thereof) with each hypothesis signal. The replica may be generated after the first signature has been determined, e.g., by reconstructing an "ideal" first signal portion based on the first signature. Alternatively, the replica may be generated by simply selecting the hypothesis signal corresponding to the first signature as replica.

The correlation procedure may form the basis for determining a look-up table that allows to look up a particular set of phantom signatures for a given first signature. Alternatively, the correlation may form the basis for determining a (simplified) mathematical expression that permits a determination of a particular set of phantom signatures based on a given first signature during run-time.

During the provision of the phantom cell set one or more parameters in addition to the first signature may be taken into account. Such parameters may include one or both of frame timing and CP configuration. As an example, the method may further comprise determining a first frame timing underlying the first signal portion, determining a second frame time underlying the second signal portion (or at least a hypothesis for the second frame timing), and providing the phantom cell set taking into account the first frame timing and the second frame timing. Additionally, or in the alternative, the phantom cell set may be provided taking into account a CP configuration or CP configuration hypothesis underlying the first signal and/or the second signal. The method may additionally comprise determining at least one of a frame timing and CP configuration based on the correlation result.

The first signature may be determined in various ways. As an example, the first signature may be determined from the correlation result (i.e., from correlating the composite signal with each hypothesis signal). In one implementation, the first signature is determined to correspond to the signature hypothesis which exhibits a correlation maximum. If, for example, the correlation result includes multiple correlation parameters, with each correlation parameter corresponding to the correlation of the composite signal with one of the hypothesis signals, the first signature may be determined to correspond to the maximum correlation parameter.

Alternatively, the first signature may be determined from a cell signature database. For example, the first signature could have been determined from the correlation result obtained by correlating a previously received signal carrying the first signature with each hypothesis signal and then stored in the cell signature database. Accordingly, if the first cell associated with the first signature has already been found before (i.e., during a previous cell search) and it is known that its first signature-carrying signals overlap the (presumed) second signature-carrying signals of the (presumed) second cell, then the first signature of the first cell may simply be determined from the cell signature database.

In the case the correlation result includes multiple correlation parameters, the step of determining the second signature may comprise modifying one or more of the correlation parameters taking into account the at least one of the first signature and the phantom signature set associated with the first signature. As an example, the correlation parameters for signature hypotheses corresponding to at least one of the first signature and the set of phantom signatures may be modified. This modification may comprise setting one or more of the correlation parameters to zero.

Based on the processed correlation result (i.e., the correlation result with modified correlation parameters), the second signature (or at least a candidate for the second signature) may be determined from one or more maximum correlation parameters. According to a first variant, the signature hypothesis corresponding to the (at least one) maximum correlation parameter is determined as the second signature. According to another variant, multiple candidates for the second signature are determined first, and the second signature is then selected from the signature candidates. As such, the signature hypothesis corresponding to the maximum correlation parameter may be determined as a first candidate for the second signature, and then a further set of phantom signatures may be provided based on the signature hypothesis corresponding to the maximum correlation parameter. A second candidate for the second signature may be determined based on the correlation result additionally taking into account the further set of phantom signatures. These steps may be iteratively repeated to determine a desired (e.g., predefined) number of candidates for the second signature. The second signature may then in a final step be selected from the two or more candidates.

When searching multiple candidates for the second signature, the search may be aborted when one of one or more predefined conditions is fulfilled. As a first example, the predefined condition may relate to a predefined number of candidates that are to be determined. A second example for such a predefined condition can be based on a threshold (e.g., the candidate search may be aborted if no further candidates above a predefined signal strength-related threshold can be found).

In one scenario, the set of phantom signatures is only taken into account for determining the second signature in case the first signature and the second signature are related to identical cell identities (e.g., cell-within-group identities) within different cell-identity groups. Each signature may be related to a cell-identity group having a particular cell-identity group identifier.

The first signal portion and the second signal portion may be synchronization signals from the first cell and the second cell, respectively. As such, the first signal portion and the second signal portion may be SSSs each indicative of a cell-identity group. The cell identities related to the first signature and the second signature, respectively, may be determined based on associated primary synchronization signals.

According to another aspect, a method of providing in cellular communication network a set of phantom signatures for cell signature determination is provided, wherein the method comprises providing a set of hypothesis signals, each hypothesis signal including a signature hypothesis, receiving a composite signal including a first signal portion carrying a first signature from a first cell and a second signal portion carrying a second signature from the second cell, wherein the first signal portion and the second signal portion overlap at least partially in time, determining the first signature, determining a set of phantom signatures, wherein each phantom signature represents an artefact from the first signal in a correlation result obtained by correlating the composite signal with each hypothesis signal, and storing the set of phantom signatures at least temporarily for being taken into account upon determining the second signature from the correlation results.

The technique presented herein may be realized in the form of software, in the form of hardware are using a combined software/hardware approach. As regards a software aspect, a computer program product comprising program code portions for performing the steps presented herein when the computer program product is run on one or more computing devices is provided. The computer program product may be stored on a computer-readable recording medium such as a memory chip, a CDROM, a DVD-ROM, a hard disk and so on. Alternatively, the computer program product may be provided for download via a communication network.

As for a hardware aspect, an apparatus for a cell signature determination in a cellular communication network is provided, wherein the apparatus comprises a memory storing a set of hypothesis signals, each hypothesis signal including a signature hypothesis, a receiver adapted to receive a composite signal including a first signal portion carrying a first signature from a first cell and a second signal portion carrying a second signature from a second cell, wherein the first signal and a second signal portion overlap at least partially in time, a correlator adapted to obtain a correlation result by correlating the composite signal with each hypothesis signal, a component adapted to determine the first signature, a unit adapted to provide a set of phantom signatures associated with the first signature, wherein each phantom signature represents an artefact from the first signal portion in the correlation result, and a processor adapted to determine the second signature based on the correlation result taking into account the set of phantom signatures associated with a first signature.

As for a further hardware aspect, an apparatus for providing in a cellular communication network a set of phantom signatures for cell signature determination is provided, wherein the apparatus comprises a first memory storing a set of hypothesis signals, each hypothesis signal including a signature hypothesis, a receiver adapted to receive a composite signal including a first signal portion carrying a first signature from a first cell and a second signal portion carrying a second signature from a second cell, wherein the first signal portion and a second signal portion overlap at least partially in time, a component adapted to determine the first signature, a processor adapted to determine a set of phantom signatures, wherein each phantom signature represents an artefact from the first signal in a correlation result obtained by correlating the composite signal with each hypothesis signal, and a second memory storing the set of phantom signatures at least temporarily for being taken into account upon determining the second signature from the correlation result. The first memory and the second memory may be realized in the form of separate memory portions within a single physical memory.

One or both of the above apparatus aspects may be implemented in a mobile terminal such as a mobile telephone, smart phone, network or data card, notebook computer, and so on. Alternatively, any of the above apparatus aspects may be implemented in a stationary terminal such as a desktop computer.

BRIEF DESCRIPTION OF THE DRAWINGS

Further aspects and advantages of the technique presented herein will become apparent from the following embodiments in conjunction with the drawings, wherein.

DETAILED DESCRIPTION

Figure 1A:
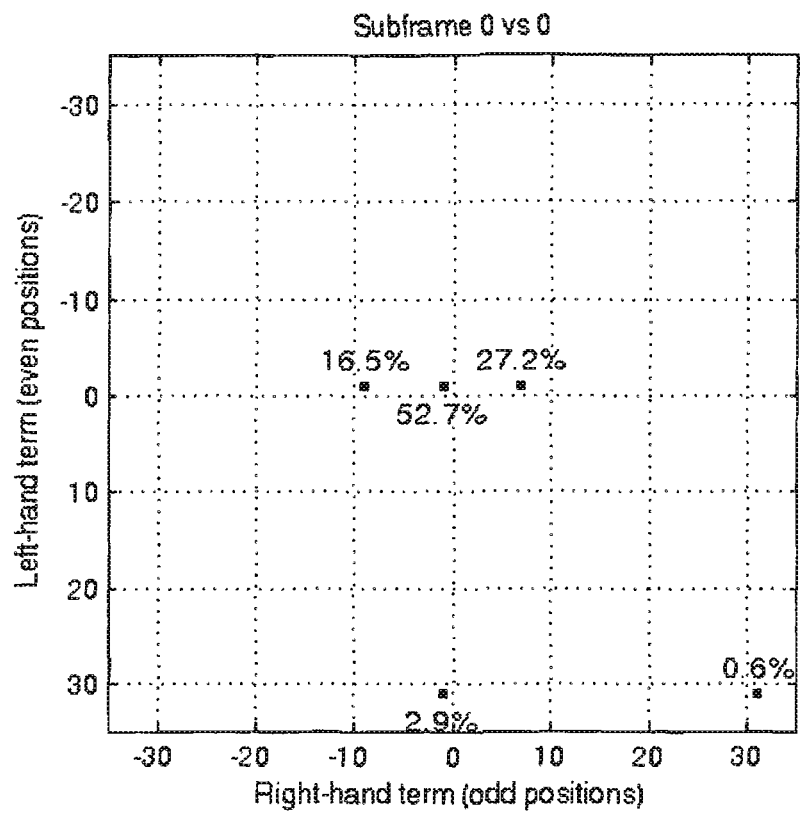
FIGS. 1a to 1d illustrate four scatter plots.
Figure 1B:
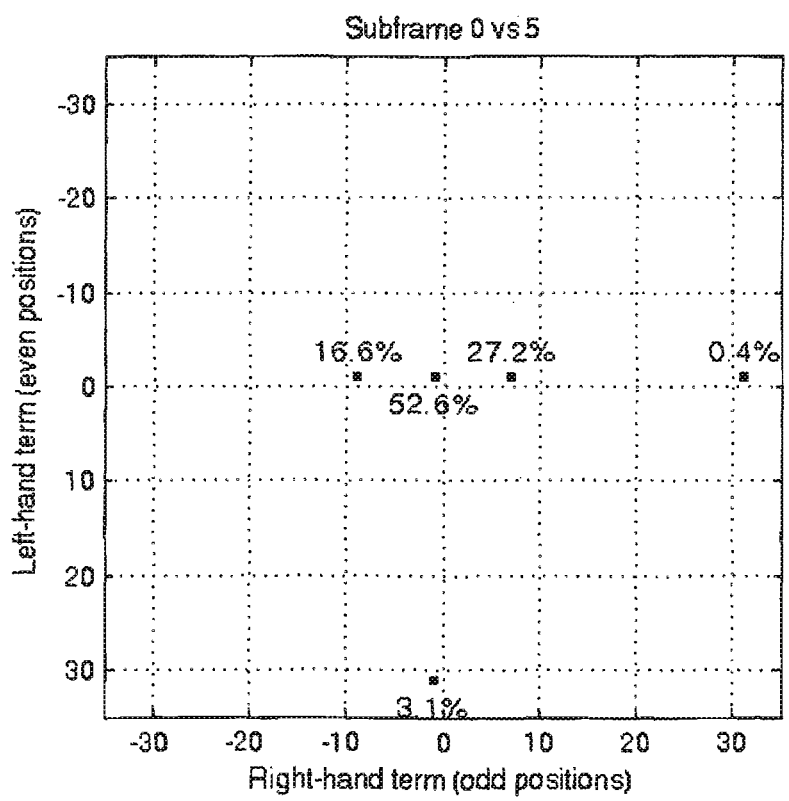

In the following description of preferred embodiments, for purposes of explanation and not limitation, specific details are set forth (such as particular communication standards and signature formats) in order to provide a thorough understanding of the technique presented herein. It will be apparent to one skilled in the art that the present technique may be practised in other embodiments that depart from these specific details. For example, while the embodiments will primarily be described in the context of the fourth generation mobile communication standard of Long Term Evolution (LTE) and corresponding E-UTRA networks, it will be evident that the technique presented herein can also be practised in connection with other communication standards and access networks.

Moreover, those skilled in the art will appreciate that the services, functions and steps explained herein below may be implemented using software functioning in conjunction with a programmed microprocessor, or using an Application Specific Integrated Circuit (ASIC), a Digital Signal Processor (DSP) or general purpose computer. It will also be appreciated that when the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

In the following, the expression phantoms cells, phantom cell groups, and so on will be used in addition to the expression phantom signature. As understood herein, each phantom signature belongs to a phantom cell or phantom cell group that has no real counterpart. Moreover, in the LTE embodiments described hereinafter, the terms signature and cell-identity group identifier/cell-within-group identifier will often be used synonymously. As defined in 3GPP CS 63.211 V.8.9.0, each SSS carrying a cell-identity group identifier is scrambled with the associated cell-within-group identifier.

When searching for cells with different cell-identity group identifiers $N_{ID}^{(1)} \in \{0, 1, \ldots, 167\}$, received at unequal strengths and whose SSS overlap at least partially, i.e., are received at almost the same time, SSS detection may result in erroneous cell group detection for the weaker cell in case both cells have the same cell-within-group identifier $N_{ID}^{(2)} \in \{0, 1, 2\}$. Investigations have shown that instead of finding the cell-identity group identifier of the weaker cell, one or more cell-identity group identifiers of "phantom cells" related to the stronger cell are often found.

As is generally known, correlation techniques (e.g., based on matched filters) are conventionally utilized for cell detection. Specifically, the received signal with the unknown cell signature is correlated with multiple hypothesis signals, each carrying one of the signature versions that may potentially be assigned in the access network ("signature hypothesis"). The hypothesis signatures are generally known a priori and can thus be pre-stored by each user terminal. For each signature hypothesis, one correlation parameter is thus obtained, and the signature hypothesis associated with the maximum correlation parameter corresponds to the cell signature carried by the received signal.

It has been found that the "phantom cells" are correlation artifacts (or "correlation spuriouses") from the signal of the stronger cell (i.e., in the present E-UTRA embodiment, from its SSS carrying a particular cell-identity group identifier $N_{ID}^{(1)}$) in the correlation parameters searched for the weaker cell. The correlation artifacts thus simulate the presence of cells that do not exist in reality.

The following embodiment illustrates an exemplary technique for phantom signature determination. As will become apparent, the phantom signatures (i.e., the "phantom" cell-identity group identifiers $N_{ID}^{(1)}$) can be derived from the previously determined (and thus known) cell signature of the stronger cell (i.e., from its cell-identity group identifier $N_{ID}^{(1)}$ or, which is equivalent, its associated shift pair $(m_0, m_1)$) and the total set of cell signatures that may potentially be assigned by the access network (i.e., all potential values of $N_{ID}^{(1)}$ $(m_0, m_1)$ as defined in Table 6.11.2.1-1 of 3GPP TS 36.211 V.8.9.0).

With reference to the signals and notation in 3GPP TS 36.211 V.8.9.0, let $$d(n), N=0, 1, \ldots, 61$$

and $$d'(n), n=0, 1, \ldots, 61$$

represent frequency-domain SSSs for two cells.

Furthermore let f(•) denote a function that uniquely maps a cell-identity group identifier $N_{ID}^{(1)}$ to a pair of shifts $(m_0, m_1)$, and define the set of all valid shift pairs (see also Table 6.11.2.1-1 in 3GPP TS 36.211 V.8.9.0)

$$\Phi = \{(m_0, m_1) : (m_0, m_1) = f(k), k=0, 1, \ldots, 167\}.$$

The sets of phantom signatures are derived by studying the cross-correlation:

$$r = \sum_{n=0}^{30} (d(2n)d'(2n) + d(2n+1)d'(2n+1))$$

where d'(n) is assumed to be associated with a known cell (i.e., the stronger cell), hence fixed, and d(n) is varied as in an exhaustive search (i.e., varied in accordance with the set of signature hypotheses). The known shift pair $(m'_0, m'_1)$ is associated with the former and $(m_0, m_1)$ with the latter.

Moreover the $N_{ID}^{(2)}$-dependent scrambling sequences are $c'_0(n)$ and $c'_1(n)$ for the former and $c_0(n)$ and $c_1(n)$ for the latter. As is easily verified, the $N_{ID}^{(2)}$-dependent scrambling is effective, and hence significant phantom signatures only arise when both d'(n) and d(n) are associated with the same cell-within-group identity $N_{ID}^{(2)}$.

Below are analyses of the above cross-correlation for the four different timing scenarios that may arise according to 3GPP TS 36.211 V.8.9.0.

Known Cell in Subframe 0, Hypothesis in Subframe 0

$$r_{00}^{(m'_0, m'_1)}(m_0, m_1) = \sum_{n=0}^{30} s_0^{(m_0)}(n) s_0^{(m'_0)}(n) c_0(n) c'_0(n) +$$

$$\sum_{n=0}^{30} s_1^{(m_1)}(n) s_1^{(m'_1)}(n) c_1(n) c'_1(n) z_1^{(m_0)}(n) z_1^{(m'_0)}(n),$$

$$(m_0, m_1) \in \Phi$$

The left-hand term will attain a maximum for cell groups for which $m_0 = m'_0$. The right-hand term will attain a maximum only if both $m_0 = m'_0$ and $m_1 = m'_1$. Clearly maximization in one partial sum is not counter-balanced by the other. FIG. 1a illustrates the pairs of values the partial sums can take in the present case.

FIGS. 1a to 1d generally show scatter plots of associated sums for the left- and right-hand terms. The correlation result r is the sum of the X and Y co-ordinates. The panels indicate the average percentage of each combination when examining all combinations of cell-identity group identifiers. Notably there are only a limited number of combinations. The correct cell-identity group identifier and frame timing result in simultaneous maximization of both co-ordinates. (The percentages in FIGS. 1a to 1d add up to less than 100% due to a truncation error.)

Figure 2A:
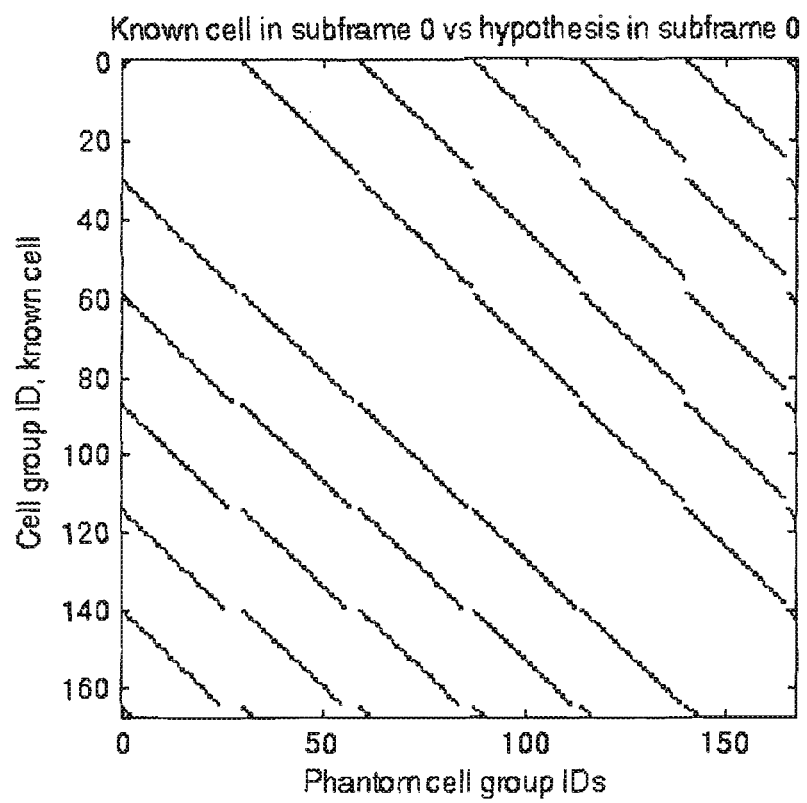
FIGS. 2a to 2d illustrate various phantom cell group sets for different timing scenarios.

Thus, in the present case the following phantom signature set is obtained $$G_{00}^{(m'_0, m'_1)} = \{(m_0, m_1) \in \Phi : m_0 = m'_0, m_1 = m'_0 + k, k \in Z, (m_0, m_1) \neq (m'_0, m'_1)\},$$

as illustrated in FIG. 2a. FIGS. 2a to 2d show phantom cell group sets for different timing scenarios. Each row indicates the phantom cell-identity group identifiers that need to be masked or processed by other means for detection of weaker cells. For a cell with cell-identity group identifier j, the phantom cell group identifiers (IDs) are indicated on the j-th row of each panel in FIGS. 2a to 2d.

Known Cell in Subframe 0, Hypothesis in Subframe 5

$$r_{01}^{(m'_0, m'_1)}(m_0, m_1) = \sum_{n=0}^{30} s_1^{(m_1)}(n) s_0^{(m'_0)}(n) c_0(n) c'_0(n) +$$

$$\sum_{n=0}^{30} s_0^{(m_0)}(n) s_1^{(m'_1)}(n) c_1(n) c'_1(n) z_1^{(m_1)}(n) z_1^{(m'_0)}(n),$$

$$(m_0, m_1) \in \Phi$$

The left-hand term will attain a maximum for cell groups for which $m_1 = m'_0$. Further, since $z_1(n)$ only exists in 8 shifts, the right-hand term will attain a maximum for cell groups for which $m_0 = m'_1$ when $\mod_8(m_1 - m'_0) = 0$ (by which the effect of the scrambling with z is removed). FIG. 1b again illustrates the pairs of values the partial sums can take. Obviously maximization in one partial sum is not counter-balanced by the other.

Figure 2B:
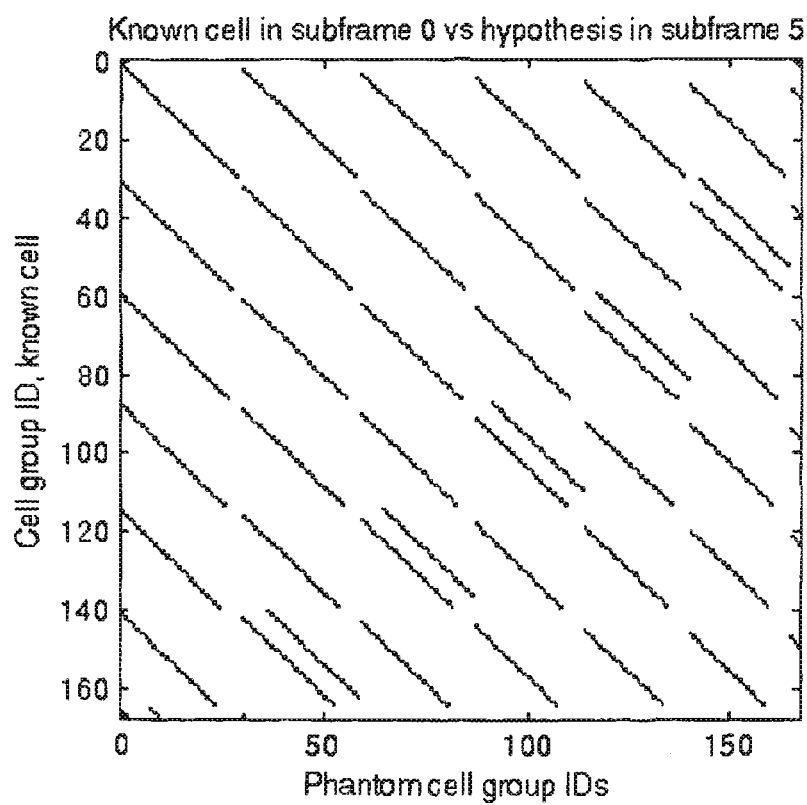

This leads to the phantom signature sets $$G_{01A}^{(m'_0, m'_1)} = \{(m_0, m_1) \in \Phi : m_0 = m'_0 - k, m_1 = m'_0, k \in Z\}$$

$$G_{01B}^{(m'_0, m'_1)} = \{(m_0, m_1) \in \Phi : m_0 = m'_1, m_1 = \mod_8(m'_0) + 8k, k \in Z\},$$

as illustrated in FIG. 2b.

Known Cell in Subframe 5, Hypothesis in Subframe 0

$$r_{10}^{(m'_0, m'_1)}(m_0, m_1) = \sum_{n=0}^{30} s_0^{(m_0)}(n) s_1^{(m'_1)}(n) c_0(n) c'_0(n) +$$

$$\sum_{n=0}^{30} s_1^{(m_1)}(n) s_0^{(m'_0)}(n) c_1(n) c'_1(n) z_1^{(m_0)}(n) z_1^{(m'_1)}(n),$$

$$(m_0, m_1) \in \Phi$$

Figure 1C:
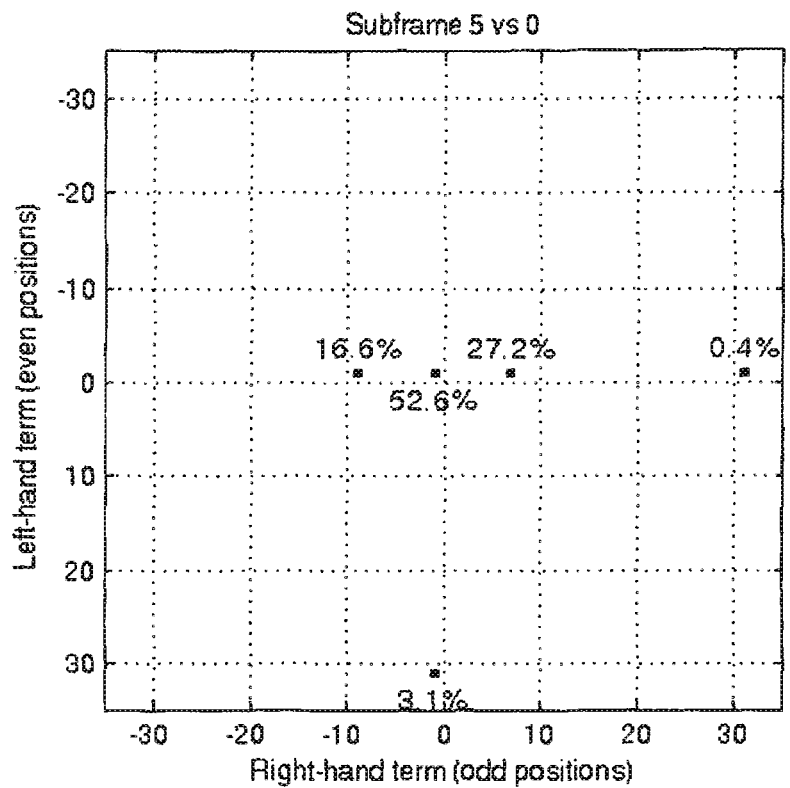

The left-hand term will attain a maximum for cell groups for which $m_0 = m'_1$. Further, since $z_1(n)$ only exists in 8 shifts, the right-hand term will attain a maximum for cell groups for which $m_1 = m'_0$ when $\mod_8(m_0 - m'_1) = 0$ (by which the effect of the scrambling with z is removed). FIG. 1c illustrates the pairs of values the partial sums can take. Maximization in one partial sum is not counterbalanced by the other.

Figure 2C:
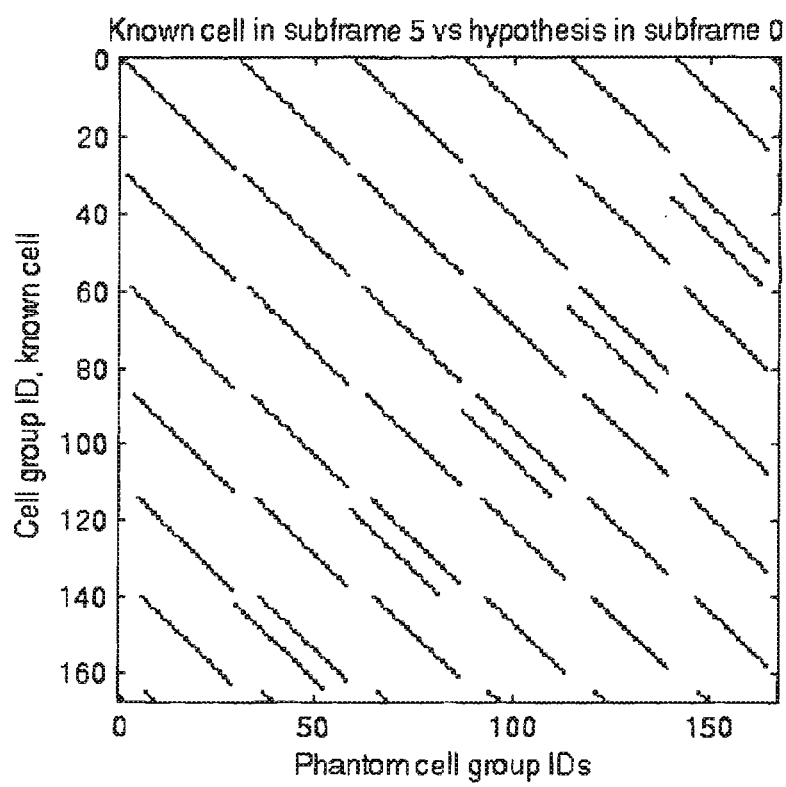

This leads to the phantom signature sets $$G_{10A}^{(m'_0, m'_1)} \in \{(m_0, m_1) \in \Phi : m_0 = m'_1, m_1 = m'_1 + k, k \in Z\}$$

$$G_{10B}^{(m'_0, m'_1)} = \{(m_0, m_1) \in \Phi : m_0 = \mod_8(m'_1) + 8k, m_1 = m'_0, k \in Z\},$$

as illustrated in FIG. 2c.

Known Cell in Subframe 5, Hypothesis in Subframe 5

$$r_{11}^{(m'_0,m'_1)}(m_0, m_1) = \sum_{n=0}^{30} s_1^{(m_1)}(n) s_1^{(m'_1)}(n) c_0(n) c'_0(n) +$$

$$\sum_{n=0}^{30} s_0^{(m_0)}(n) s_0^{(m'_0)}(n) c_1(n) c'_1(n) z_1^{(m_1)}(n) z_1^{(m'_1)}(n),$$

$$(m_0, m_1) \in \Phi$$

Figure 1D:
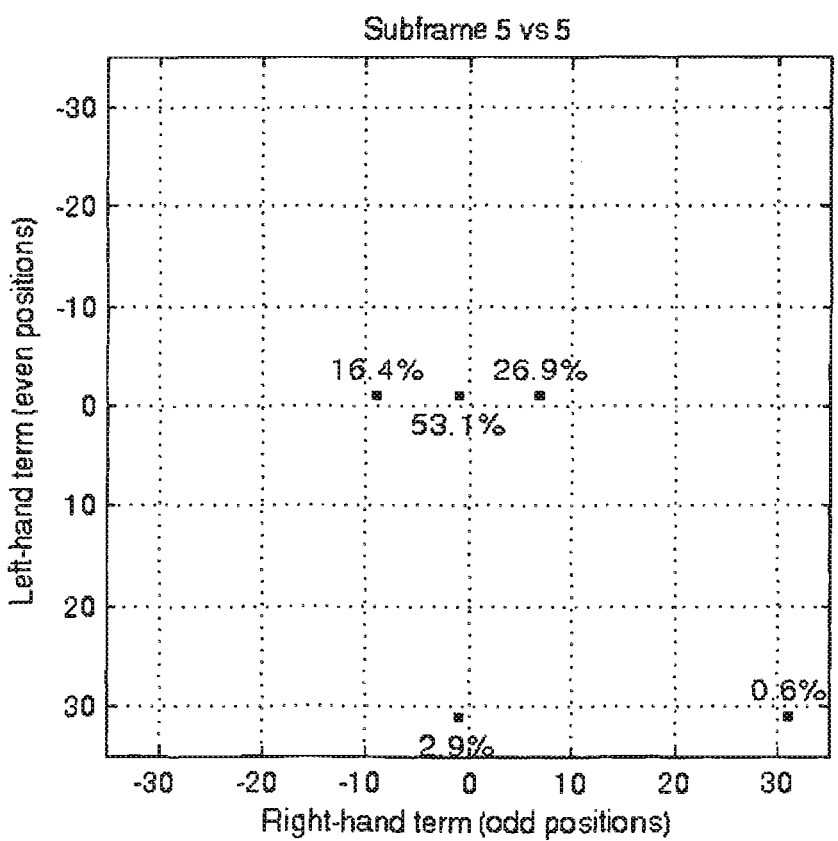

The left-hand term will attain a maximum for cell groups for which $m_1 = m'_1$. The right-hand term will attain a maximum only if both $m_0 = m'_0$ and $m_1 = m'_1$. FIG. 1d illustrates the pairs of values the partial sums can take. Clearly maximization in one partial sum is not counter-balanced by the other.

Figure 2D:
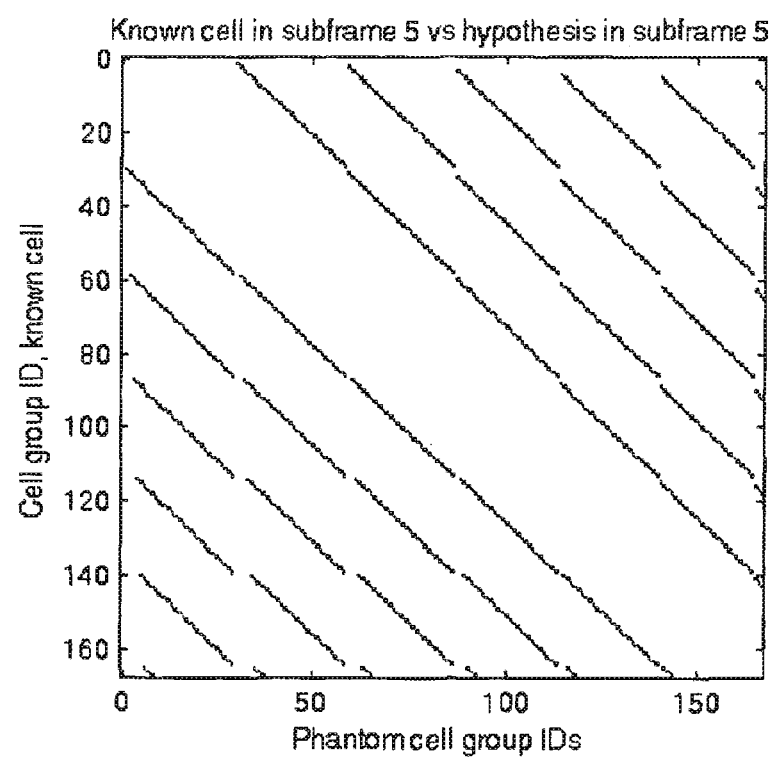
Figure 3A:
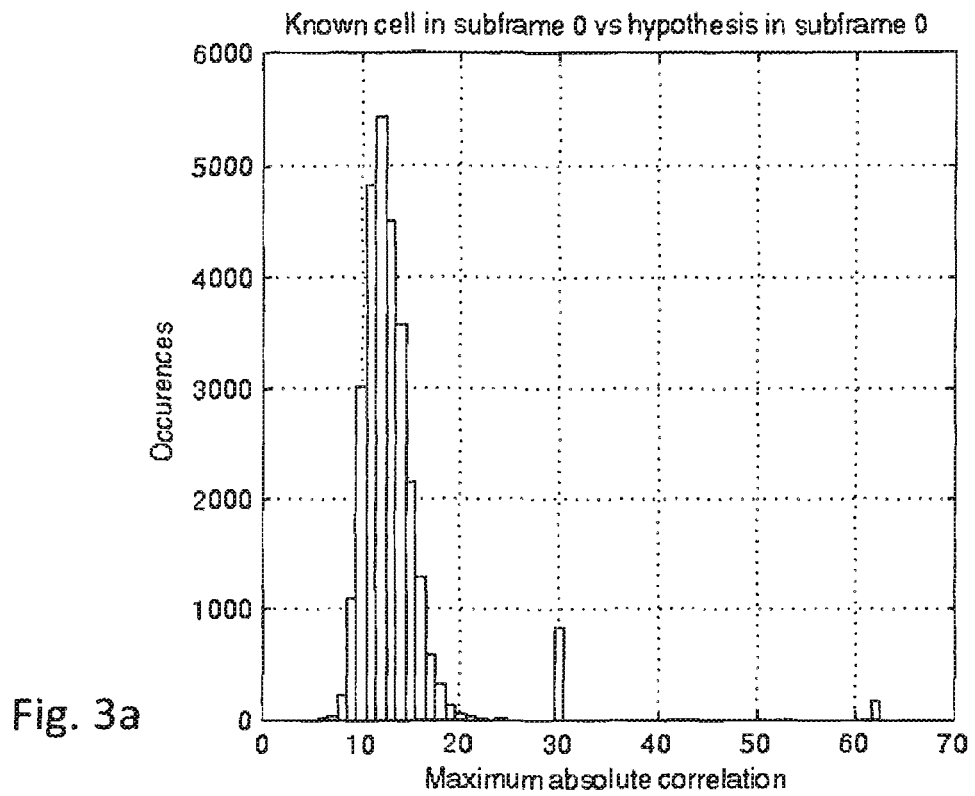
FIGS. 3a to 3d illustrate histograms of correlation results when not masking phantom signatures or known signatures.
Figure 3B:
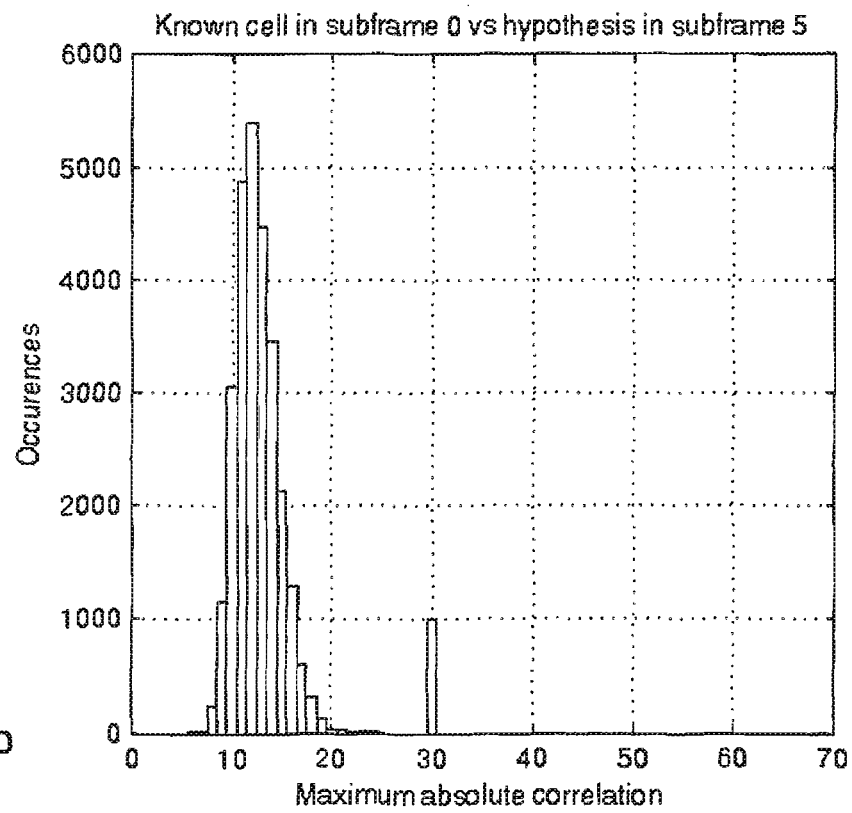
Figure 3C:
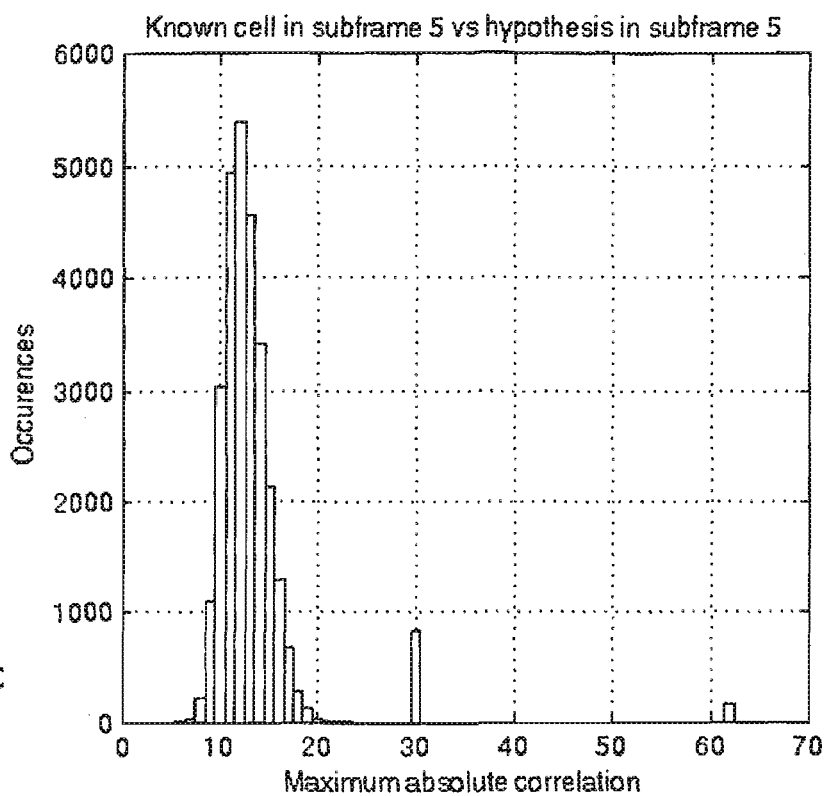
Figure 3D:
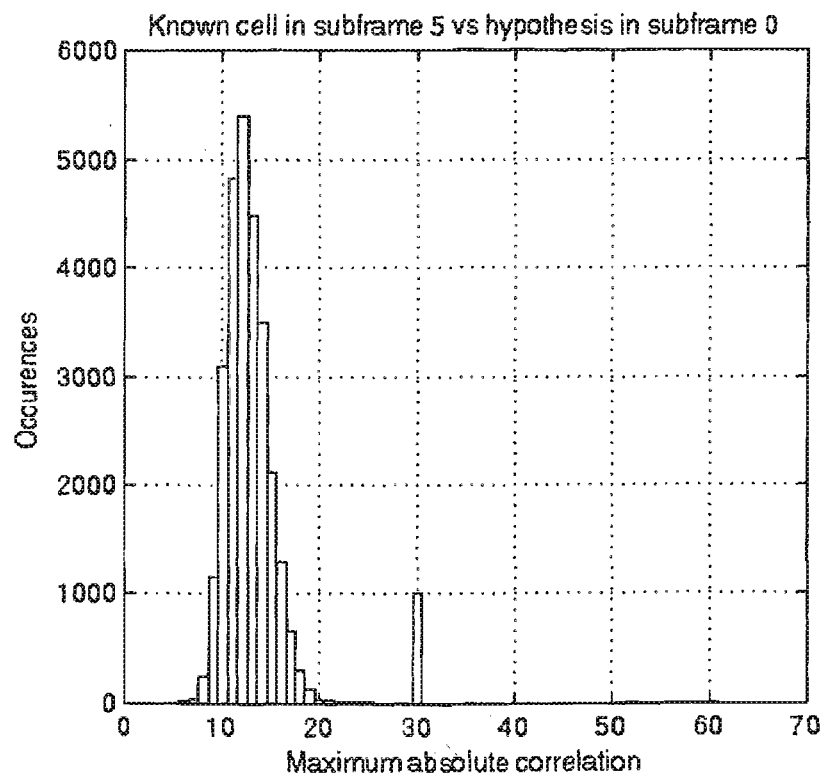
Figure 4A:
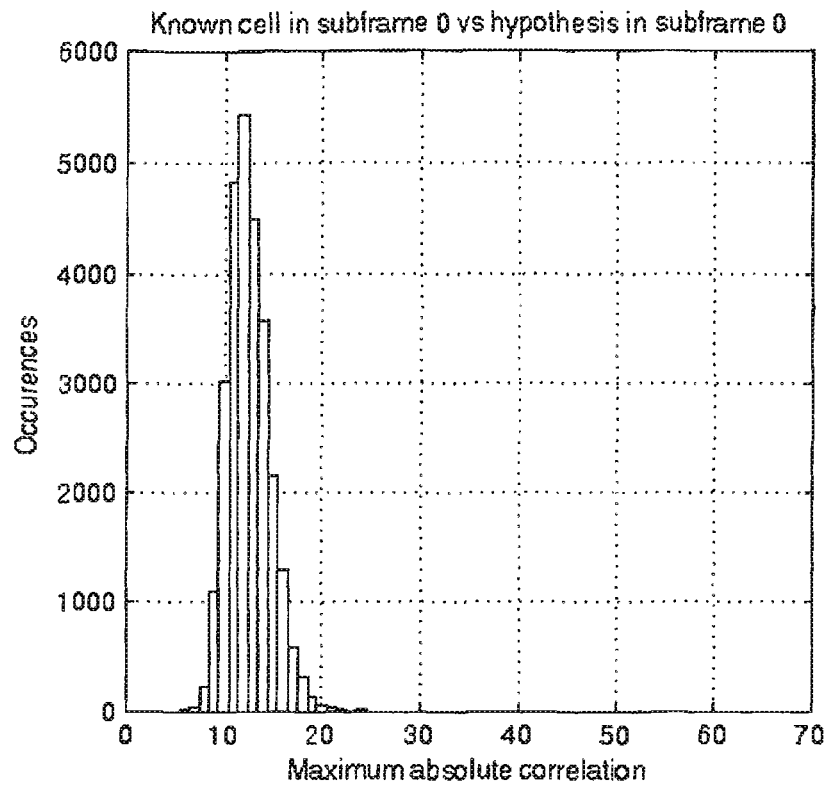
FIGS. 4a to 4d illustrates histograms of correlation results when masking phantom signatures and known signatures.
Figure 4B:
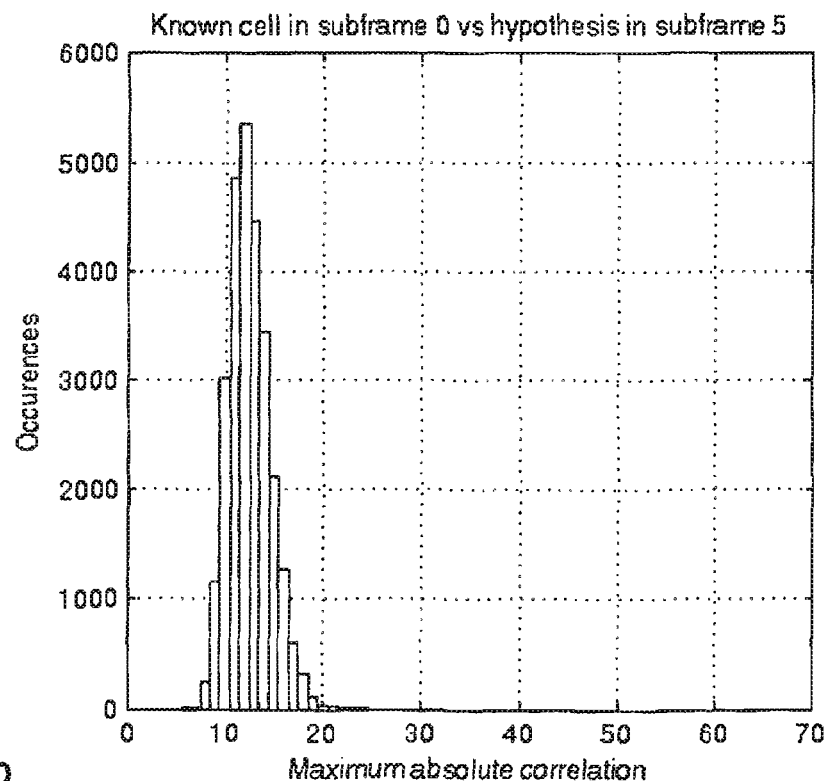
Figure 4C:
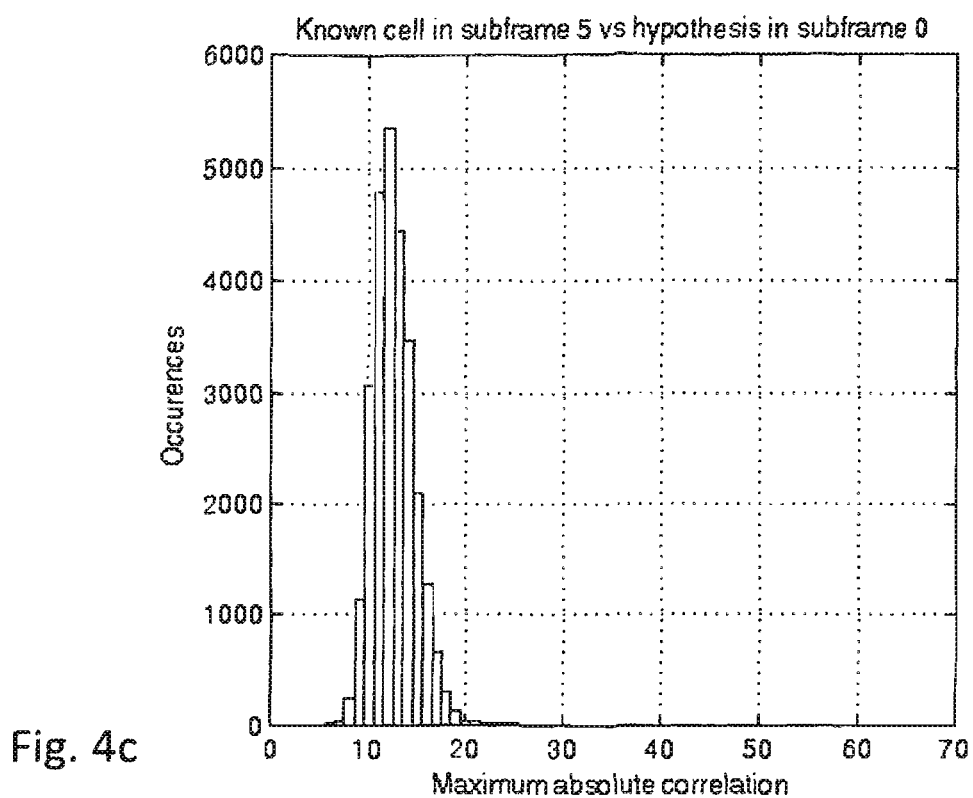
Figure 4D:
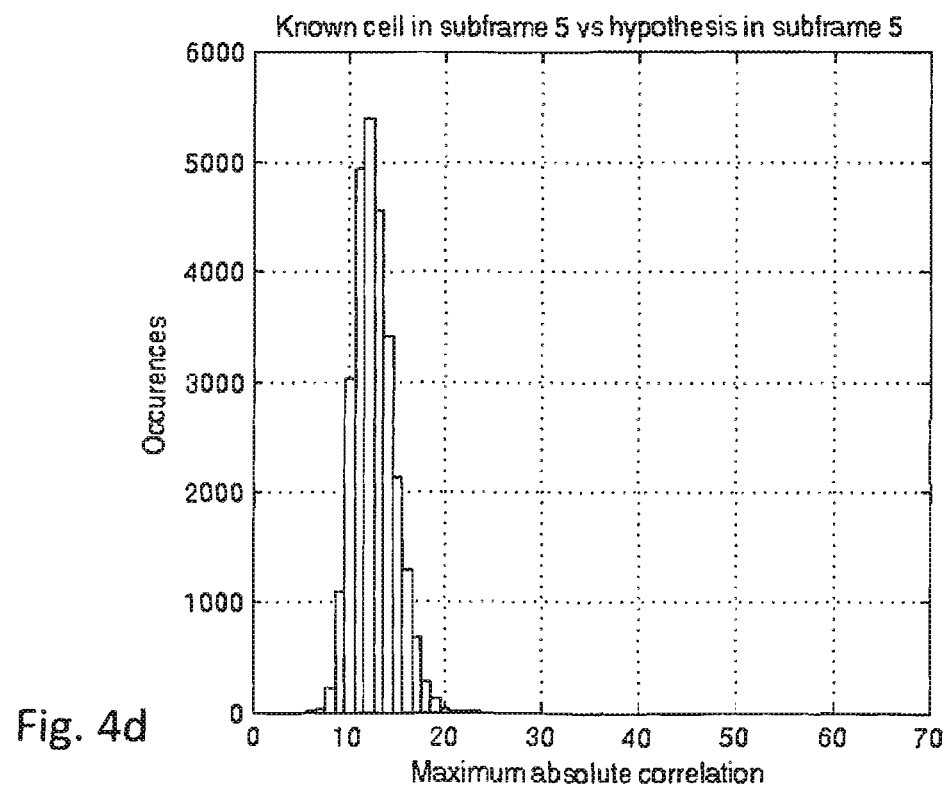

This leads to the phantom signature set $$G_{11}^{(m'_0,m'_1)} = \{(m_0, m_1) \in \Phi : m_0 = m'_1 - k, m_1 = m'_1, k \in Z, (m_0, m_1) \neq (m'_0, m'_1)\},$$

as illustrated in FIG. 2d.

FIGS. 3a to 3d show histograms of correlation results (maximum absolute correlation) when convolving two time-domain representations of SSSs as discussed above. All combinations of $(m_0, m_1)$ and $(m'_0, m'_1)$ are considered, and the latter sequence is is padded with an extended CP.

The bins at 62 represent the case when $(m_0, m_1)$ and $(m'_0, m'_1)$ match, i.e., when the correct cell identity group identifier $N_{ID}^{(1)}$ and frame timing are hypothesized for the stronger cell. For the top-right and bottom-left panels the bins at 62 are empty because in these cases the timing hypothesis does not match the frame timing of the stronger cell, and only phantom cells result. The bins at 30 represent phantom cells, i.e. correlation artifacts that impair the proper identification of weaker cells not illustrated in FIGS. 3a to 3d.

As a consequence of the phantom cells (bins at 30), it will take longer time until a weaker cell is found in the correlation result, if it can be found at all. Moreover the presence of phantom cells potentially leads to a waste of processing power since a user terminal may initiate Reference Signal Received Power (RSRP) measurements for the phantom cells as part of cell candidate validation. The bins around 15 represent the "noise floor" that is generally obtained when convolving two different SSSs with each other. Cells that are so weak that they fall within the range of this "noise floor" (for a strong cell) will be impossible to detect. As has been mentioned above, the technique presented herein addresses the problem of phantom cells associated with the bins at 30.

FIGS. 4a to 4d show the same scenario as FIGS. 3a to 3d after masking the phantom cells (bins at 30) as defined above, using the appropriate phantom signature sets. Additionally, the known cell-identity group identifier of the stronger cell (bins at 62) is masked. In the present embodiment, the cell-identity group identifiers corresponding to phantom cells for each cell group have been removed (zeroed), resulting in empty bins when calculating the histograms of FIGS. 4a to 4d. Accordingly, the phantom cells are effectively removed, and thus the possibility of detecting weaker cells (not illustrated in FIGS. 4a to 4d) is improved.

In the following embodiments, the above strategy of phantom cell detection and the above expressions for determining the phantom signatures are exploited to detect weaker cells having SSSs which overlap at least partially with the SSSs of one or more stronger cells.

As has been discussed above, overlapping synchronization signals can occur in both duplex modes (FDD and TDD) of E-UTRA networks. In synchronous networks (FDD and TDD), two sets of phantom signatures are associated with each cell. Which set to use depends on whether SSS detection is carried out in subframe 0 or subframe 5.

In asynchronous systems (FDD), four sets of phantom signatures are associated with each cell, and which set to use for each newly detected cell depends on the frame timing of the already known cell, and the frame timing currently hypothesized for the yet-to-be detected cell.

Figure 5:
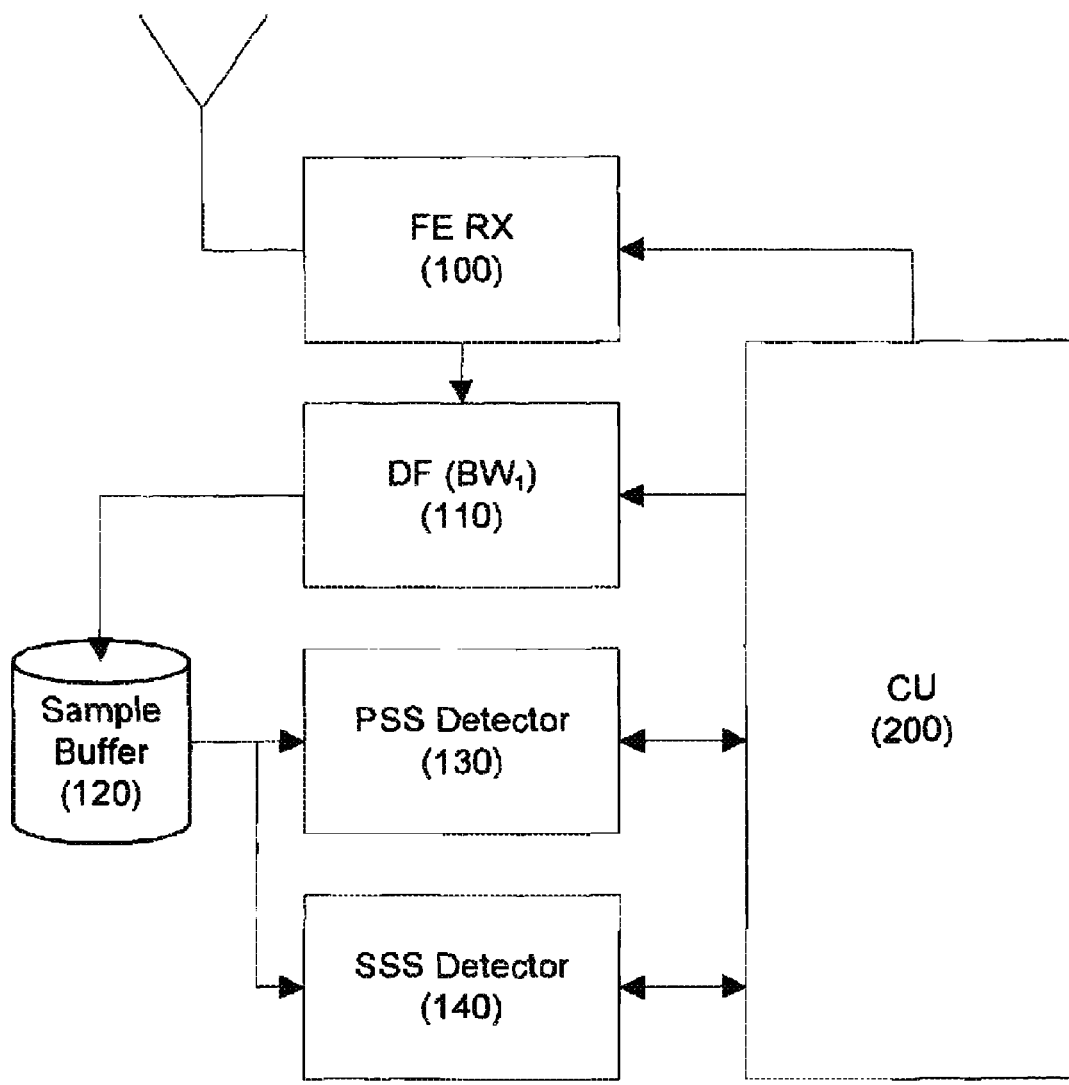
FIG. 5 schematically illustrates a receiver embodiment.

FIG. 5 illustrates an embodiment of a mobile terminal 10 configured for cell signature determination in an E-UTRA network. Cell signature determination by the mobile terminal 10 may be performed in the context of connected mode mobility within E-UTRA. Connected mode mobility is supported by measurements carried out by the mobile terminal 10 and then reported to the E-UTRA network (not shown in FIG. 5). The network utilizes the measurement reports from the user terminal when deciding whether to handover the user terminal 10 to another cell (i.e., to another eNodeB), but also for other purposes such as network optimization and cell planning. The measurements carried out by the mobile terminal 10 in the context of connected mode mobility include detection of neighbouring cells (cell search) and signal strengths estimation (e.g., RSRP estimation). The core requirements defined in 3GPP TS 36.133, V8.8.0 stipulate that the user terminal 10 shall be able to detect and report to the network intra-frequency neighbouring cells within a predefined time span.

E-UTRA cell search comprises frequency and symbol synchronization, frame synchronization and PCI acquisition. As mentioned above, cell search is facilitated by two control signals transmitted on a 5 ms basis in each cell, namely the PSS and SSS.

The user terminal 10 is configured to perform PSS and SSS detection as will now be described in more detail.

As illustrated in FIG. 5, the user terminal 10 comprises a conventional receiver front-end 100 coupled to one or more antennas and configured to amplify a received signal. In the present context, it will be assumed that the received signal is a composite signal including a first SSS carrying a cell-identity group identifier ("first signature") from a first cell and a second SSS carrying a second cell-identity group identifier ("second signature") from a second cell. It will further be assumed that the first SSS and the second SSS overlap at least partially in time, which may happen in both duplex modes (FDD and TDD) of an E-UTRA network.

The user terminal 10 further comprises a digital filter 110 configured to filter the composite signal amplified by the receiver front-end 100. The digital filter 110 has a predefined bandwidth that suppresses sub-carriers outside the central 72 sub-carriers as the SSS is mapped onto the central 62 Resource Elements (REs). Optionally, the received composite signal may additionally be down-sampled.

A sample buffer 120 is provided to store the filtered (and optionally down-sampled) signal samples in the form of Orthogonal Frequency Division Multiplexing (OFDM) symbols after symbol synchronization by a PSS detector 130. SSS detection is then carried out by an SSS detector 140 based on the buffered OFDM symbols and under control of a control unit 200.

Figure 6:
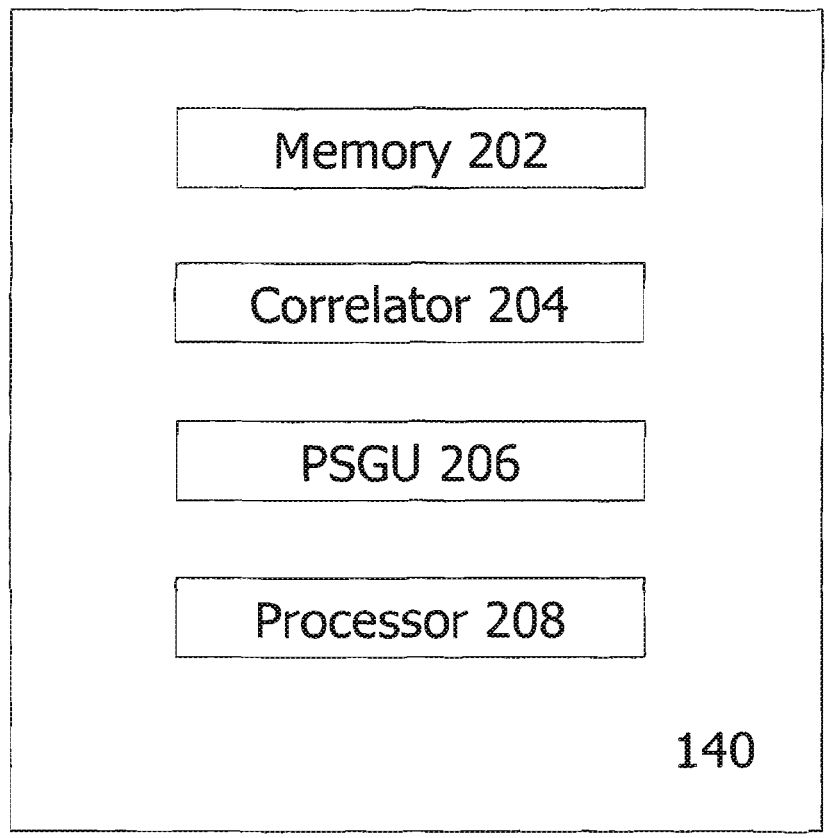
FIG. 6 schematically illustrates a configuration of an SSS detector of the receiver embodiment of FIGS. 1a to 1d.

The configuration of the SSS detector 140 is illustrated in more detail in FIG. 6. As becomes apparent from FIG. 6, the SSS detector 140 comprises a memory 202, a correlator 204, a phantom signature provisioning unit 206 as well as a processor 208.

The memory 202 stores a predefined set of hypothesis signals a priori known to the user terminal 10. Each hypothesis signal includes one of the signatures ("signature hypothesis") that may be assigned in the E-UTRA network. In the present embodiment, SSS detection will be considered in more detail, and for this reason one dedicated hypothesis signal is provided for each of the 168 cell-identity group identifiers (or, which is equivalent, for each shift pair ($m_0$, $m_1$)) as defined in Table 6.11.2.1-1 of 3GPP TS 36.211, V8.9.0. The memory 202 may additionally store one or more sets of phantom signatures (i.e., phantom cell-identity group identifiers or phantom shift pairs) after same have been determined. Alternatively, the one or more phantom signature sets may be stored in a memory different from the memory 202.

The correlator 204 is adapted to obtain a correlation result by correlating the received composite signal with each hypothesis signal. As an exemplary realization, the correlator 204 may take the form of a matched filter, in which case the correlation result corresponds to the filter output. The correlator 204 is in the present embodiment also configured to determine the cell-identity group identifier ("first signature") of the stronger cell ("first cell") from the correlation result. In other embodiments, the cell-identity group identifier of the stronger cell may be otherwise determined or simply signalled to the user terminal 10.

The unit 206 is configured to provide a set of phantom signatures associated with the cell-identity group identifier of the stronger cell. As has been discussed above, each phantom signature represents a correlation artefact from the SSS of the stronger cell in the correlation result obtained by the correlator 204.

Finally, the processor 208 is adapted to determine the cell-identity group identifiers ("second signatures") of one or more weaker cells ("second cells") based on the correlation results obtained by the correlator 204 and additionally taking into account the set of phantom signatures associated with the cell-identity group identifier of the stronger cell.

Figure 7:
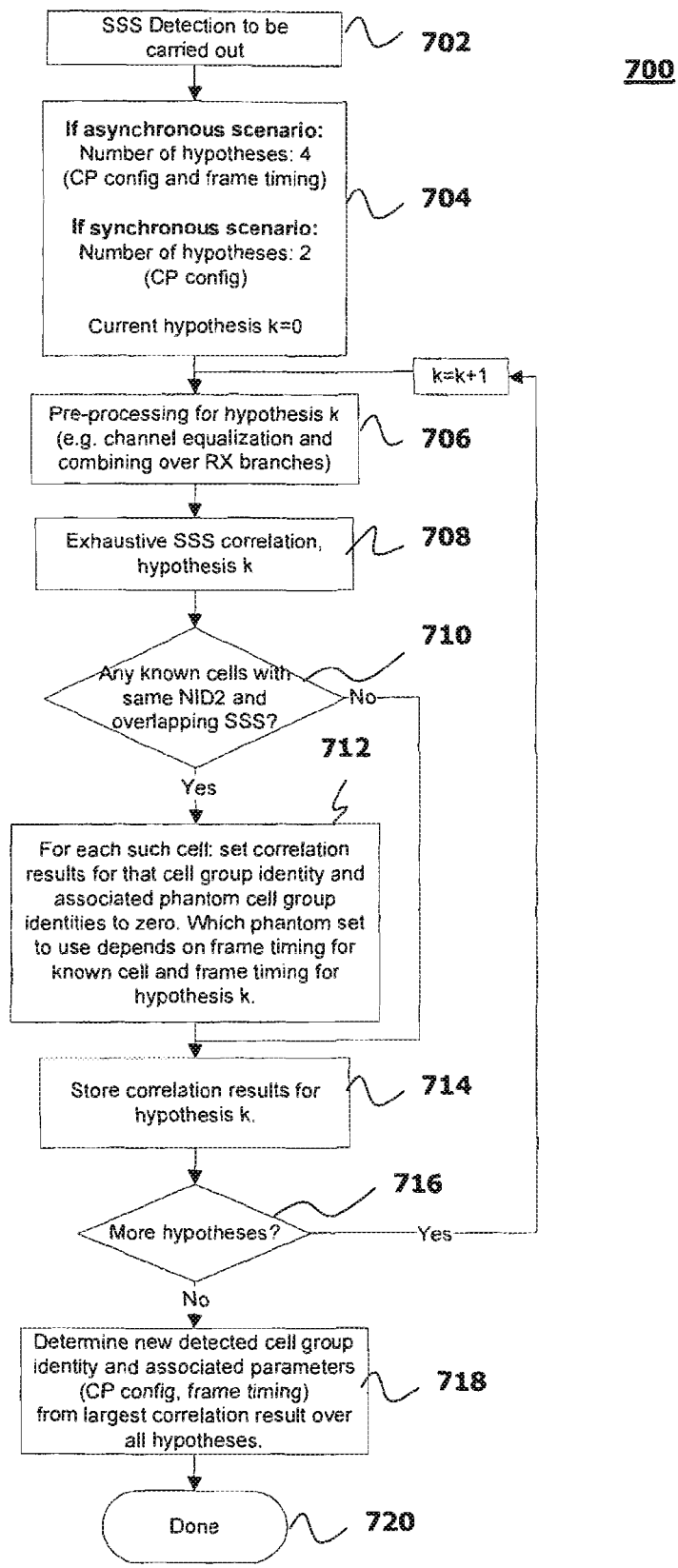
FIG. 7 illustrates a first method embodiment.

The operation of the user terminal 10 will now be described in more detail with reference to the exemplarily flow chart 700 of FIG. 7. The flow chart 700 illustrates a method embodiment that may be practised by the user terminal 10 or any other device during a cell search procedure. As will become apparent below, the cell search procedure not only delivers a cell signature, but also (as a by-product) frame timing and CP configuration information.

It will be assumed in the following that a potential cell with a specific cell-within-group identity had already been detected by the PSS detector 130 based on the signal samples stored in the sample buffer 120. To this end, the PSS detector 130 performs matched filtering using the three-cell-within-group identities ("PSS versions") that may potentially be assigned. The matched filtering is performed over at least 5 ms of received samples. As is well known, correlation peaks in the filter output will reveal PSSs from one or more neighbouring cells. This procedure is also referred to as symbol synchronization.

Upon having established symbol synchronization and identified the cell-within-group identity by the PSS detector 130, the next step is SSS detection by the SSS detector 140 in cooperation with the control unit 200. In the present LTE embodiment, SSS detection yields frame timing, PCI (by determining the cell-identity group identifier in addition to the cell-within-group identifier already determined by the PSS detector 130) and CP configuration.

SSS detection by the SSS detector 140 starts in step 702 once the potential cell with a certain cell-within-group identifier has been detected by the PSS detector 130 as discussed above. Alternatively, SSS detection may also start if the potential cell with a given cell-within-group identity has been hypothesized to be at a particular frame timing (hidden cell search).

In step 704, it is determined whether or not the cells within the E-UTRA network are aligned with respect to their frame timing. In a synchronous scenario, two sets of phantom cells will be associated with each cell in accordance with two possible CP configurations. In an asynchronous scenario, four sets of phantom cells will be associated with each cell due to two potential CP configurations and two potential frame timings. In step 704, a hypothesis counter k is set to zero and a first CP configuration hypothesis (and, optionally, a first frame timing hypothesis) is selected.

Then, in step 706, SSS detection is continued by calculating channel estimates based on the PSS and applying the channel estimates to the composite signal samples in the sample buffer 120 which are hypothesized to carry the SSS. As a result of this channel equalization, a compensation for linear phase and propagation channel influences is performed. In the case the user terminal 10 comprises more than one receiver branch, the composite signal samples received on different receiver branches are combined.

After the pre-processing step 706, the resulting OFDM symbol is correlated by the correlator 204 with each of the 168 hypothesis signals stored in the memory 202 for the current CP configuration and, optionally, frame timing hypothesis (i.e., subframe 0 or subframe 5). This correlation yields a correlation result in the form of 168 correlation parameters (or correlation values). In other words, one correlation parameter is obtained for each hypothesized cell-identity group identifier (i.e., for each signature hypothesis).

In a further step 710 it is determined whether any other cells are already known with an identical cell-within-group identifier as assumed in the present SSS detection process and whose SSSs overlap the currently processed OFDM symbol. In the embodiment of FIG. 7 it is assumed that one or more other cells have already been found on a previous cell search occasion, so that the corresponding cell-within-group identifiers as well as cell-identity group identifiers can be retrieved from a local cell signature database (stored, for example, in the memory 202). In another embodiment that will be described more detail with reference to FIG. 8 below, multiple cells could be detected at the same time (i.e., from a single correlation result).

If it is determined in step 710 that there exist one or more previously determined cells with the same cell-within-group identity than the potential cell currently evaluated and with overlapping SSSs, the method proceeds with step 712. In step 712, sets of phantom signatures (i.e., sets of cell-identity group identifiers) are derived for each of these cells taking into account the frame timing of the known cell and the currently hypothesized frame timing as has been discussed above.

There exist various possibilities for determining the phantom signature sets. According to one variant, look-up tables are provided that permit to determine the applicable phantom signature groups based on the cell-identity group identifier of the known cell, its frame timing and the currently hypothesized frame timing. According to an alternative variant, which avoids the use of memory-intensive look-up tables, the phantom signature sets are calculated during run-time utilizing the expressions for G derived above. According to this variant, the phantom signature cells can be easily calculated when needed.

Once the phantom signatures have been determined, the phantom signatures are masked by setting the corresponding correlation parameters to zero. Additionally, the correlation parameters of the one or more known cells are set to zero. This procedure has already been described above with reference to FIGS. 3a to 3d and 4a to 4d.

In a next step 714, the correlation result modified by masking the correlation parameters corresponding to the phantom signatures and the signatures of one or more the known cells are stored for the current hypothesis value k in the memory 202. As becomes apparent from FIG. 7, the correlation results are immediately stored without any modification in case it is determined in step 710 that there exist no known cells with the same cell-within-group identity and having overlapping SSSs.

Then, in step 716 it is determined if additional hypotheses have to be examined. Should this be the case, the hypothesis counter k is incremented and the process loops back to step 706. Alternatively, i.e., if all hypothesis have been examined, the method proceeds with step 718. In step 718, the maximum correlation parameter (maximum correlation magnitude) of all correlation parameters for all hypotheses (2 for synchronous and 4 for asynchronous networks) is searched. The position of the maximum correlation magnitude within the correlation result indicates the cell-identity group identifier associated with the currently processed SSS. Moreover, additional information such as CP configuration and/or frame timing can be deduced from the hypothesis yielding the maximum correlation magnitude. The "winning" cell-identity group identifier is then reported to the control unit 200 along with the CP configuration and/or frame timing and SSS detection by the SSS detector 140 is finished (step 720).

In order to handle bad cell planning with respect to correlation properties of the cell-identity group identifiers, the cell search is carried out in such manner that with respect to an arbitrary cell, the targeted SSS alternates between the SSS for subframe 0 and the one for subframe 5. Hence a kind of jittering of the measurement window is used. The reason for this jittering is the fact that the sets G00 and G11 as well as and G01A and G10A do not contain the same phantom cell-identity group identifiers. Mathematically speaking, $$G_{00}^{(m'0,m'1)} \cap G_{11}^{(m'0,m'1)} = \emptyset$$

and $$G_{01A}^{(m'0,m'1)} \cap G_{10A}^{(m'0,m'1)} = \emptyset.$$

This means that the phantom cell groups that are masked in subframe 0 are not the same as those for subframe 5. In synchronous networks only $G_{00}^{(m'0,m'1)}$ and $G_{11}^{(m'0,m'1)}$ are of interest, and hence this solves any problem with bad cell planning—if a cell is masked in subframe 0, it can be found in subframe 5.

In asynchronous networks, G01B and G10B are needed in addition to the aforementioned sets. Unfortunately, $$G_{01B}^{(m'0,m'1)} \cap G_{10B}^{(m'0,m'1)} = \emptyset,$$

hence some cells will be masked for both subframe 0 and 5. Synchronized cells are rare in asynchronous networks, but since it cannot be ruled out that some cells overlap, occasionally one may run SSS detection without any phantom cell group masking at all, thereby having a fair chance to detect the concerned cell when it is strong enough (stronger than the strongest phantom cell).

It is understood that the selection of the winning cell-identity group identifier can be based on other properties than the correlation magnitude, e.g. on the real-valued part of correlation result (since the SSS when analyzed in the frequency domain is a real-valued sequence), the minimum of the left-hand and right-hand terms (since for the correct cell-identity group identifier both the left-hand term and the right-hand term shall be maximized, whereas for phantom cells, only one of the terms), and so on.

Figure 8:
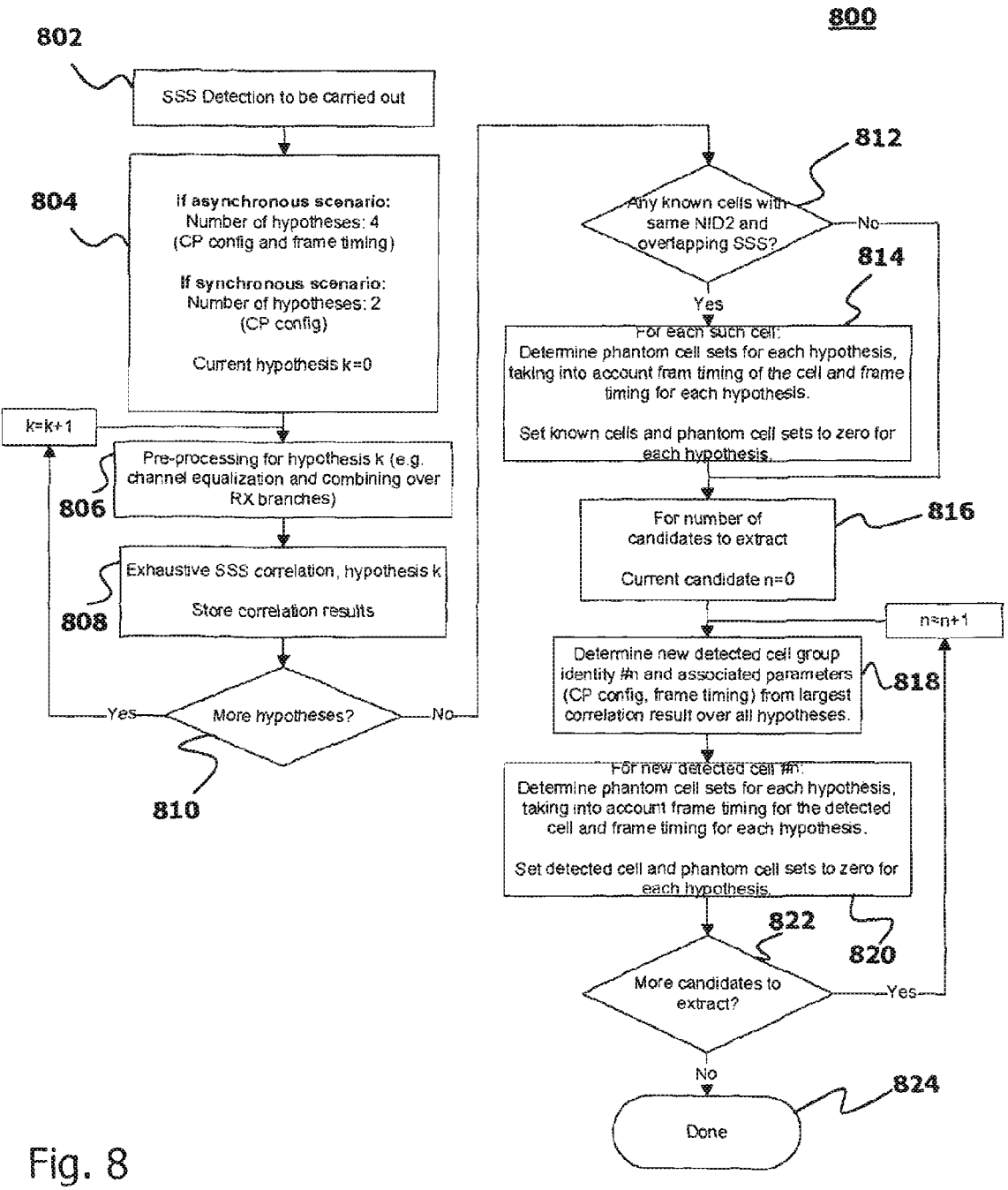
FIG. 8 illustrates a second method embodiment.

FIG. 8 illustrates a flow chart 800 of a further method embodiment that may be practised by the user terminal 10 or any other device. Steps 802 to 808 correspond to steps 702 to 708 of the method embodiment illustrated in FIG. 7, respectively, and will therefore not be described in more detail. Slightly deviating from step 708, the correlation results are immediately stored in step 808 (corresponding to step 714) without any prior modification until all hypotheses have been examined (step 810). Steps 812 and 814 again essentially correspond to steps 710 and 712, respectively.

Next, the following procedure is repeated until a pre-determined number of signature candidates has been extracted once a candidate counter n has been set to zero in step 816.

In step 818, a candidate cell-identity group identifier and an associated CP configuration and/or frame timing is determined from the maximum correlation magnitude over all hypotheses. In a next step 820, the associated phantom signature sets are determined for this cell and for each hypothesis (in a similar manner as described above with respect to the first method embodiment). Moreover, the correlation parameters for the phantom cell-identity group identifiers and the newly detected cell-identity group identifier are set to zero. It is then determined in step 822 whether there are more candidate cell-identity group identifiers to be extracted. Should this be the case, the candidate counter n is incremented and the method loops back to step 818 until the predetermined number of candidate cell-identity group identifiers has been acquired. The candidates and associated CP configurations and/or frame timings are finally reported to the control unit 200, and SSS detection is finished (step 824).

The control unit 200 selects one or more (or all) of the candidates in accordance with a predefined selection strategy. After the selection, the control unit 200 will start validating the selected candidates by RSRP measurements. Whether to initiate measurements for all candidates or only for a selected subset of (one or more) candidates may depend on various considerations. In cases in which, for example, thresholds have been used in the "inner loop" of steps 818 to 822, the candidate extraction may to end when only potential cells of uninterestingly low signal levels remain. Otherwise, such candidates for potential cells may be included in the predetermined number of extracted candidates, and the control unit 200 may have to implement a, for example, threshold-based selection strategy in order to discard potential cells of uninterestingly low signal levels.

Bad network planning can be handled in the same manner as described for the first method embodiment above. Moreover, selection of the winning candidates can be based on other parameters as the correlation maximum (as also described for the first method embodiment).

As has already briefly been mentioned above, in the second method embodiment of FIG. 8, an additional or alternative exit condition besides the number of candidates to be extracted may be provided. As an example, if the correlation parameter of a detected cell is considerably weaker than the correlation parameter of the strongest cell (that is to be determined before starting any masking of previously determined cells), then there will obviously be many false detections of cell groups that are even weaker than the phantom cells (see FIGS. 3a to 3d and 4a to 4d: maximum around bin 15). Accordingly, a configurable threshold may be utilized to stop the candidate collection prematurely. Such a threshold may, for example, correspond to 30% of the maximum correlation parameter (as the bins around 15, i.e., the "noise floor", are to be excluded). Alternatively, or in addition, the corresponding information may be provided to the control unit 200 to allow for an evaluation (e.g., a candidate selection) before an RSRP measurement or any other procedure is initiated.

Figure 9:
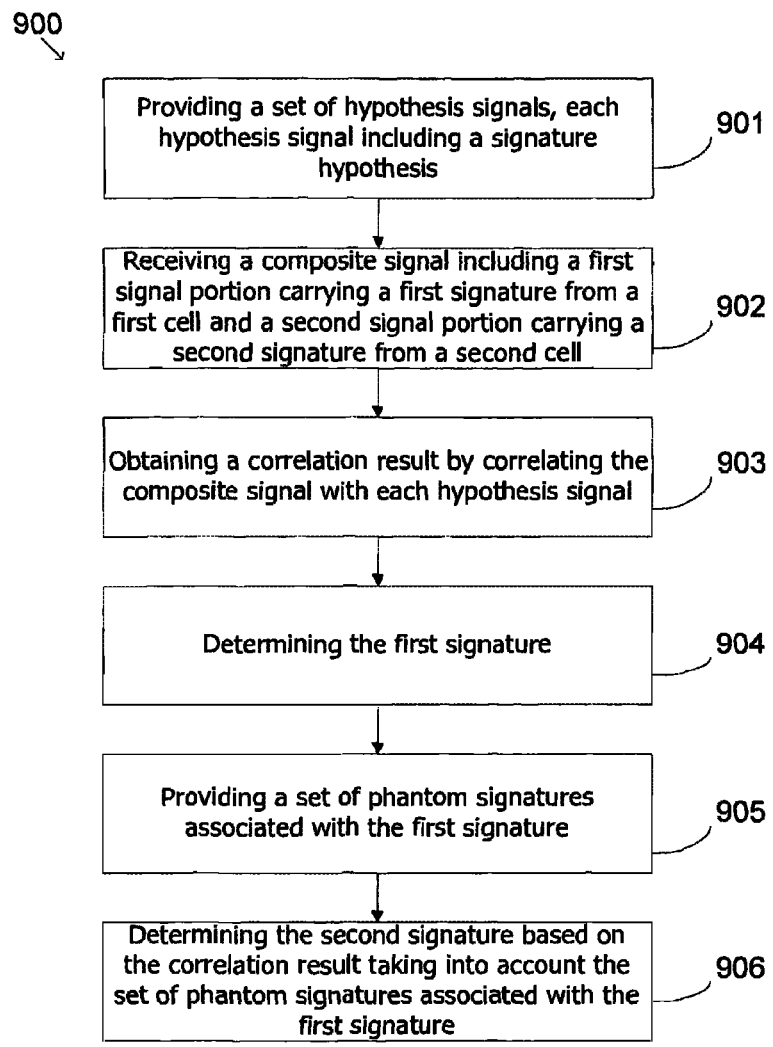
FIG. 9 illustrates a general method embodiment.

The general operation for cell signature determination in a cellular communication network can be made with reference to the flow chart 900 of FIG. 9. The flow chart 900 illustrates a general method embodiment that may be practised by the user terminal 10 or any other device during a cell search procedure. In step 901a set of hypothesis signals is provided, each hypothesis signal including a signature hypothesis. In step 902 a composite signal is received, where the composite signal includes a first signal portion carrying a first signature from a first cell and a second signal portion carrying a second signature from a second cell, and where the first signal portion and the second signal portion overlap at least partially in time. In a next step 903, a correlation result is obtained by correlating the composite signal with each hypothesis signal, and in step 904 the first signature is determined, for example as discussed in more detail above. After the first signature has been determined, a set of phantom signatures associated with the first signature is provided in step 905. Each phantom signature represents an artefact from the first signal portion in the correlation result. Finally, in step 906, the second signature is determined based on the correlation result taking into account the set of phantom signatures associated with the first signature.

As has become apparent from the above description of exemplary embodiments, the technique presented herein permits to prevent systematic false detections that arise when searching for cells the synchronization signals of which are received at approximately the same time (and, optionally, at different strengths). The present technique is particularly useful in case the cells exhibit overlapping SSSs (e.g., in TDD and synchronous FDD E-UTRA networks). As a result, cell search time will be reduced since fewer attempts have to be carried out to find a particular cell. Additionally, processing power, which is a scarce resource in battery operated devices such as mobile terminals can be saved. Processing power savings result in particular from the decreased risk of initiating RSRP measurements for validation of phantom cells.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous. Because the technique presented herein can be varied in many ways, it will be recognized that the invention should be limited only by the scope of the claims that follow.

The invention claimed is:

1. A method of cell signature determination in a cellular communication network, the method comprising:
   providing a set of hypothesis signals, each hypothesis signal including a signature hypothesis;
   receiving a composite signal including a first signal portion carrying a first signature from a first cell and a second signal portion carrying a second signature from a second cell, wherein the first signal portion and the second signal portion overlap at least partially in time;
   correlating the composite signal with each hypothesis signal to obtain a correlation result;
   determining the first signature;
   providing a set of phantom signatures associated with the first signature, wherein each phantom signature represents an artifact from the first signal portion in the correlation result; and
   determining the second signature based on the correlation result and the set of phantom signatures associated with the first signature.

2. The method of claim 1, further comprising:
   determining the set of phantom signatures based on a correlation of the first signal portion, or a replica thereof, with each hypothesis signal; and
   if the replica is used, generating the replica based on the first signature.

3. The method of claim 2, wherein the determining comprises determining the phantom signatures as correlation maxima yielded by the correlation of the first signal portion, or the replica thereof, with each hypothesis signal.

4. The method of claim 1, wherein providing the set of phantom signatures comprises calculating the set of phantom signatures during run-time based on the first signature.

5. The method of claim 1, further comprising:
   determining a first frame timing of the first signal portion; and
   hypothesizing a second frame timing of the second signal portion;
   wherein providing the set of phantom cells is based on the first frame timing and the hypothesized second frame timing.

6. The method of claim 1, wherein determining the first signature comprises determining the first signature from the correlation result.

7. The method of claim 1, wherein the correlation result includes multiple correlation parameters, each correlation parameter corresponding to the correlation of the composite signal with one of the hypothesis signals.

8. The method of claim 7, wherein determining the second signature comprises:
   modifying one or more of the correlation parameters for signature hypotheses that correspond to at least one of the first signature and the set of phantom signatures.

9. The method of claim 8, further comprising:
   setting one or more of the correlation parameters for signature hypotheses that correspond to at least one of the first signature and the set of phantom signatures to zero.

10. The method of any claim 7, wherein determining the second signature based on the correlation result comprises:
    determining a signature hypothesis corresponding to at least one maximum correlation parameter.

11. The method of claim 10, wherein determining the second signature comprises determining the second signature to be the signature hypothesis corresponding to the at least one maximum correlation parameter.

12. The method of claim 11, further comprising:
    determining a first candidate for the second signature to be the signature hypothesis corresponding to the maximum correlation parameter;
    providing an additional set of phantom signatures based on the signature hypothesis corresponding to the maximum correlation parameter;
    determining a second candidate for the second signature based on the correlation result and the additional set of phantom signatures; and
    determining the second signature from a least the first candidate and the second candidate.

13. The method of claim 12, wherein the determination of the first and second candidates is repeated until a predefined number of candidates has been determined.

14. The method of claim 12, wherein the determination of the first and second candidates is repeated until no further candidate above a predefined signal strength-related threshold can be found.

15. The method of claim 1:
wherein each signature is related to a cell identity group having a particular cell group identity; and
wherein the first signature and the second signature are related to identical cell identities within different cell identity groups.

16. The method of claim 15, further comprising:
determining the cell identities related to the first signature and the second signature based on associated primary synchronization signals;
wherein the first signal portion and the second signal portion are secondary synchronization signals from the first cell and the second cell, respectively.

17. The method of claim 1, further comprising determining at least one of a frame timing and a cyclic prefix configuration based on the correlation result.

18. A method of providing a set of phantom signatures for cell signature determination in a cellular communication network, comprising:
providing a set of hypothesis signals, each hypothesis signal including a signature hypothesis;
receiving a composite signal including:
a first signal portion of a first signal, the first signal portion carrying a first signature from a first cell; and
a second signal portion carrying a second signature from a second cell;
wherein the first signal portion and the second signal portion overlap at least partially in time;
determining the first signature;
determining a set of phantom signatures, wherein each phantom signature represents an artifact from the first signal in a correlation result obtained by correlating the composite signal with each hypothesis signal; and
storing the set of phantom signatures for use in determining the second signature from the correlation result.

19. An apparatus for cell signature determination in a cellular communication network, the apparatus comprising:
a memory storing a set of hypothesis signals, each hypothesis signal including a signature hypothesis;
a receiver configured to receive a composite signal including a first signal portion carrying a first signature from a first cell and a second signal portion carrying a second signature from a second cell, wherein the first signal portion and the second signal portion overlap at least partially in time;
a correlator configured to:
obtain a correlation result by correlating the composite signal with each hypothesis signal; and
determine the first signature;
a provisioning unit configured to provide a set of phantom signatures associated with the first signature, wherein each phantom signature represents an artifact from the first signal portion in the correlation result; and
a processor configured to determine the second signature based on the correlation result and the set of phantom signatures associated with the first signature.

20. An apparatus for providing a set of phantom signatures for cell signature determination in a cellular communication network, the apparatus comprising:
a first memory storing a set of hypothesis signals, each hypothesis signal including a signature hypothesis;
a receiver configured to receive a composite signal including:
a first signal portion of a first signal, the first signal portion carrying a first signature from a first cell; and
a second signal portion carrying a second signature from a second cell;
wherein the first signal portion and the second signal portion overlap at least partially in time;
a correlator configured to determine the first signature;
a provisioning unit configured to determine a set of phantom signatures, wherein each phantom signature represents an artifact from the first signal in a correlation result obtained by correlating the composite signal with each hypothesis signal; and
a second memory storing the set of phantom signatures for use in determining the second signature from the correlation result.

* * * * *

UNITED STATES PATENT AND TRADEMARK OFFICE
CERTIFICATE OF CORRECTION

| | |
|---|---|
| PATENT NO. | : 8,781,467 B2 |
| APPLICATION NO. | : 13/699179 |
| DATED | : July 15, 2014 |
| INVENTOR(S) | : Axmon et al. |

It is certified that error appears in the above-identified patent and that said Letters Patent is hereby corrected as shown below:

Specification

In Column 7, Line 4, delete "d(n),N=0,1,..., 61" and insert -- d(n),n=0,1,..., 61 --, therefor.

In Column 9, Line 26, delete "sequence is is" and insert -- sequence is --, therefor.

In Column 14, Line 42, delete "may to" and insert -- may --, therefor.

Signed and Sealed this
Twenty-third Day of February, 2016

Michelle K. Lee
*Director of the United States Patent and Trademark Office*